US007607594B2

(12) United States Patent
Saripalli

(10) Patent No.: US 7,607,594 B2
(45) Date of Patent: Oct. 27, 2009

(54) NOZZLE APPARATUS AND METHODS FOR PROVIDING A STREAM FOR ULTRASONIC TESTING

(75) Inventor: Kondala R. Saripalli, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 729 days.

(21) Appl. No.: 11/027,572

(22) Filed: Dec. 30, 2004

(65) Prior Publication Data

US 2006/0144969 A1 Jul. 6, 2006

(51) Int. Cl.
*B05B 1/06* (2006.01)
*B05B 1/02* (2006.01)
*B05B 1/00* (2006.01)
*B05B 1/14* (2006.01)
*G01N 29/04* (2006.01)

(52) U.S. Cl. .................... 239/590.3; 239/589; 239/590; 138/37; 138/44; 73/644

(58) Field of Classification Search ............. 239/102.1, 239/102.2, 461–463, 468, 469, 472, 476, 239/482, 483, 589, 590, 590.3, 590.5, 592, 239/594, 596, 600, DIG. 3; 73/632, 644; 138/37, 40, 42, 44; 137/625.3, 625.28, 625.38
See application file for complete search history.

(56) References Cited

U.S. PATENT DOCUMENTS

| | | | | | |
|---|---|---|---|---|---|
| 3,880,399 | A | * | 4/1975 | Luthe | 251/121 |
| 4,393,991 | A | * | 7/1983 | Jeffras et al. | 239/102.2 |
| 4,507,969 | A | * | 4/1985 | Djordjevic et al. | 73/644 |
| 4,558,598 | A | * | 12/1985 | Young | 73/644 |
| 4,930,701 | A | * | 6/1990 | Porter et al. | 239/102.2 |
| 5,133,383 | A | * | 7/1992 | King | 137/625.3 |
| 5,215,260 | A | * | 6/1993 | Robbins | 239/590.5 |
| 5,431,342 | A | | 7/1995 | Saripalli et al. | |
| 6,435,216 | B2 | * | 8/2002 | McCulloch | 138/42 |

* cited by examiner

*Primary Examiner*—Darren W Gorman

(57) ABSTRACT

Nozzle apparatus and methods for producing a flow stream for ultrasonic testing are disclosed. In one embodiment, a nozzle assembly includes an outerbody and an innerbody disposed within the outerbody. The innerbody includes a first portion adapted to receive a fluid medium radially through a plurality of first baffle apertures into a first chamber, and a second portion adapted to provide a first passage for the fluid medium from the first chamber to a second chamber. The innerbody further includes a third portion adapted to receive the fluid medium radially through a plurality of second baffle apertures into a third chamber, and a fourth portion adapted to provide a second passage for the fluid medium from the third chamber to an exit aperture.

20 Claims, 7 Drawing Sheets

11

NOZZLE APPARATUS AND METHODS FOR PROVIDING A STREAM FOR ULTRASONIC TESTING

FIELD OF THE INVENTION

This invention relates generally to nozzle apparatus and methods, more specifically, to nozzles for generating specified exhaust streams for ultrasonic testing.

BACKGROUND OF THE INVENTION

Nondestructive ultrasonic scanning or testing systems often utilize a coupling medium, typically a water mixture, discharged from a nozzle against the material or test object being scanned. The coupling medium in the form of a stream of fluid conducts ultrasonic waves to and from the material being scanned.

Laminar flow in the stream directed against the test object reduces backsplash generating noise and increases the signal to noise ratio as there is less signal attenuation and less noise and backscatter in the stream itself. Laminar flow also permits an increase in the throw distance, the distance between the nozzle and the test piece, that may be utilized without an unacceptable signal to noise ratio. Increased throw distance also facilitates improved ultrasonic testing, by way of example, by permitting streams to be properly directed against complex shaped test pieces, increasing testing speeds by providing more options for positioning of the streams and test equipment relative to the test object, and providing greater testing location accuracy as a result of less gravity induced drooping in the stream.

Streams may be directed at the test piece from one or more sides of the test piece, depending on the nature of the testing desired, such as reflective or transmissive ultrasonic testing. Laminar flow is also desirable in other applications beyond ultrasonic testing. Nozzles currently utilized in ultrasonic testing may employ porous media filters to generate laminar streams, as disclosed for example in U.S. Pat. No. 5,431,342 issued to Saripalli et al. The filters can require periodic cleaning. This results in undesirable down time for the testing equipment. Accordingly, there is an unmet need for nozzles providing for laminar flow without the use of porous media filters.

SUMMARY

The present invention is directed to nozzle apparatus and methods for producing a flow stream for ultrasonic testing. Embodiments of the present invention may provide a flow stream that is substantially laminar, and may require less maintenance in comparison with prior art nozzle assemblies.

In one embodiment, a nozzle assembly for providing a flow stream of a fluid medium along a longitudinal axis includes an outerbody having at least one intake adapted to receive the fluid medium, and an innerbody disposed within the outerbody. The innerbody includes a first portion adapted to receive the fluid medium radially-inwardly toward the longitudinal axis through a plurality of first baffle apertures into a first chamber, and a second portion adapted to provide a first passage for the fluid medium from the first chamber to a second chamber, the second chamber being spaced apart from the first chamber along the longitudinal axis. The innerbody further includes a third portion adapted to receive the fluid medium radially-outwardly from the longitudinal axis through a plurality of second baffle apertures into a third chamber, and a fourth portion adapted to provide a second passage for the fluid medium from the third chamber to an exit aperture, the exit aperture being spaced apart from the third chamber along the longitudinal axis.

BRIEF DESCRIPTION OF THE DRAWINGS

The preferred and alternative embodiments of the present invention are described in detail below with reference to the following drawings.

DETAILED DESCRIPTION

Nozzle apparatus and methods for producing a flow stream for ultrasonic testing are disclosed. Many specific details of certain embodiments of the invention are set forth in the following description and in FIGS. 1 through 7 to provide a thorough understanding of such embodiments. One skilled in the art, however, will understand that the present invention may have additional embodiments, or that the present invention may be practiced without several of the details described in the following description.

In general, embodiments of the present invention may provide a desired quality of flow exiting from a nozzle without utilizing media filters. In one embodiment, a flow entering a nozzle in accordance with the present invention goes through a series of baffles and relatively narrow annular passages that ensure uniform distribution of the flow. A linear annular diffuser with a relatively shallow angle may further reduce the flow velocity and turbulence. The flow is then accelerated by an axisymmetric contraction with minimal build up of a boundary layer. The flow then exits through a nozzle, resulting in a substantially uniform and substantially laminar stream.

Figure 1:
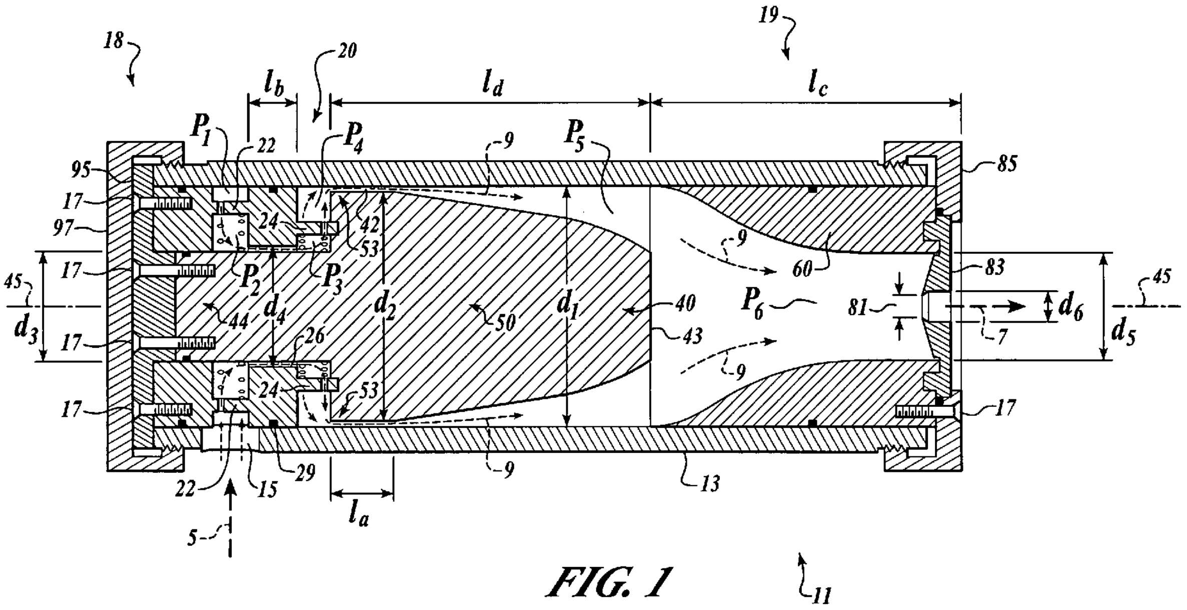
FIG. 1 is a cross-section of an exemplary nozzle in accordance with an embodiment of the present invention.

FIG. 1 is a longitudinal cross-section of an exemplary nozzle 11 of the present invention. By way of example, but not limitation, the nozzle 11 has a cylindrical body 13 with an inside diameter $d_1$, a first end 18 and a second end 19. A base 95 caps the first end 18. The base 95 is held in place by a base retainer 97. In this embodiment, the base retainer 97 is a threaded cap that is connected through matching threads to the first end 18. The base 95 is attached to a flow conditioner 20 and a diffuser 40 utilizing threaded fasteners 17, holding the flow conditioner 20 and the diffuser 40 in place within the first end 18 of the body 13, when the base 95 is clamped against the first end 18 of the body 13. In one particular embodiment, the inside diameter $d_1$ may be approximately 2.5" and the body 13 may have an overall length of approximately 8.86".

As further shown in FIG. 1, an orifice end retainer 85 holds a collector 60 in place within the second end 19. The orifice end retainer 85 also holds an end cap 83 in place. The end cap 83 defines an orifice 81 from which a flow stream 7 exits along a longitudinal axis 45 of the nozzle 11. By way of example, in one particular embodiment, the orifice 81 has an approximate diameter $d_6$ of 0.312". Preferably, the flow stream 7 may be a substantially laminar flow stream.

In operation, a first flow 5 enters the nozzle 11 through a lateral entrance 15 through the body 13 near the first end 18. It will be appreciated that more than one entrance 15 suitably may be utilized as an entrance for the first flow 5 into the nozzle 11. Entering the nozzle 11, the first flow 5 generally follows a fluid path 9, first entering a first plenum PI defined by the body 13 and the flow conditioner 20 that fits concentrically inside the body 13. A plenum or plenum chamber may include a widened area for fluid flow to slow, pressures to equalize, and turbulence to decrease. Alternately, a plenum or plenum chamber may be simply a point in the flow path 9 between transitions, passages, baffles, or couplings. In this example, the first plenum $P_1$ is annular or ring-shaped defined by the inside diameter $d_1$ of the body 13 and a cylindrical first baffle 22 defined by a perforated solid portion of the flow conditioner 20 with an outside diameter less than $d_1$. The shaped first plenum $P_1$ is further defined or restrained on its sides by other solid portions of the flow conditioner 20.

Fluid flows radially inwardly through the first baffle 22 into a second plenum chamber $P_2$. The second plenum chamber $P_2$ is defined by an outside diameter $d_3$ of a cylindrical solid stem end 44 of the diffuser 40. The stem 44 extends through and is held concentrically within the flow collector 20 by fasteners 17 holding the diffuser 40 to the base 95. The outside diameter $d_3$ of the stem 44 has a diameter that is less than the inner diameter of the first baffle 22, thus defining the ring shaped second plenum chamber $P_2$. Put differently, the second plenum chamber $P_2$ is annular or ring-shaped surrounding the cylindrical stem 44 of the diffuser 40.

The fluid path 9 exits from the second plenum chamber $P_2$ through a first axial passageway 26, directed towards the second end 19 of the body 13. The first axial passageway 26 is defined by an inner diameter $d_4$ of the flow conditioner 20, in this example embodiment one-eighth of an inch larger in diameter than the cylindrical stem 44 with a diameter $d_3$. The first axial passageway 26 is thus a ring-shaped or annular passageway parallel to the longitudinal axis 45 of the nozzle 11 with a one-$16^{th}$ inch gap between the flow-conditioner 20 and the stem 44 all the way around the stem 44. In this example embodiment, the first axial passageway 26 has a length $l_b$ that is at least approximately three times longer than its width.

From the first axial passageway 26, the fluid path 9 enters a third plenum chamber $P_3$ defined by the outer diameter $d_3$ of the stem 44 of the diffuser 40 and an inner diameter of a second cylindrical baffle 24 formed by a perforated solid portion of the flow conditioner 20. The second cylindrical baffle 24 has an inside diameter larger than the outside diameter $d_3$ of the stem 44. The fluid path 9 then passes radially outward through the second cylindrical baffle 24 into a fourth plenum chamber $P_4$ defined by an outer diameter of the second cylindrical baffle 24 and the inside diameter $d_1$ of the body 13, with the outside diameter of the second cylindrical baffle 24 being less than $d_1$.

The fluid flow 9 then proceeds around the outside shoulders 53 of the diffuser 40, between the diffuser 40 and the body 13, directed further towards the second end 19 of the nozzle 11. The diffuser 40 thus has a cylindrical stem 44 with a conical wider head 50 both integral to the diffuser 40. The head 50 of the diffuser 40 has a diffuser head diameter $d_2$, at the base of the head 50, near the shoulders 53, by way of example, but not limitation, one-eighth inch less than the inside diameter $d_1$ of the body 13. The diffuser head 50 thus defines the inner surface of a second axial passageway 42 parallel with the longitudinal axis 45. The diffuser head 50 near the base of the head, commencing at the shoulder 53, has constant diameter $d_2$ for a distance of $l_a$. The second axial passageway thus has a length of $l_a$. The diffuser head 50 then tapers inward, away from the inside diameter of the body 13 forming an annular conical diffuser which constitutes a fifth plenum area $P_5$. The diffuser 40 has a tip 43, typically where a transducer is installed for generating and receiving ultrasonic waves transmitted through the exit stream 7 of the nozzle 11. In this figure, however, the transducer is not shown.

As the fluid path 9 passes the diffuser end 43 flowing towards the second end 19, the flow is collected in a six plenum chamber $P_6$ by a collector 60 with a tapering inside diameter directing the fluid path 9 together and towards the orifice 81 where the fluid flow exits the nozzle 11 as the flow stream 7. The collector has a length $l_c$ as its inside diameter tapers from $d_1$ equal to the inside diameter of the body 13 to a collector exit diameter $d_5$ greater than three times the exit orifice diameter $d_6$ from which the stream 7 exits the nozzle 11.

As further shown in FIG. 1, the collector 60 and the end cap 83 defining the orifice 81 are held in place on the second end 19 of the body 13 by the orifice end retainer 85, a ring cap connected to the second end 19 through matching internal and external threads. Fasteners 17 extend through orifice end retainer 85 into the collector 60, clamping the collector 60 to the orifice end retainer 85. The end cap 83 with the orifice 81, by way of example, is clamped between the orifice end retainer 85 and the collector 60 at the second end 19, with the collector 60 extending at least partially into the body. By way of example, but not limitation, the diffuser head 50 and the collector 60 projecting from opposite ends in this example nozzle 11 do not overlap within the body 13.

Figure 2:
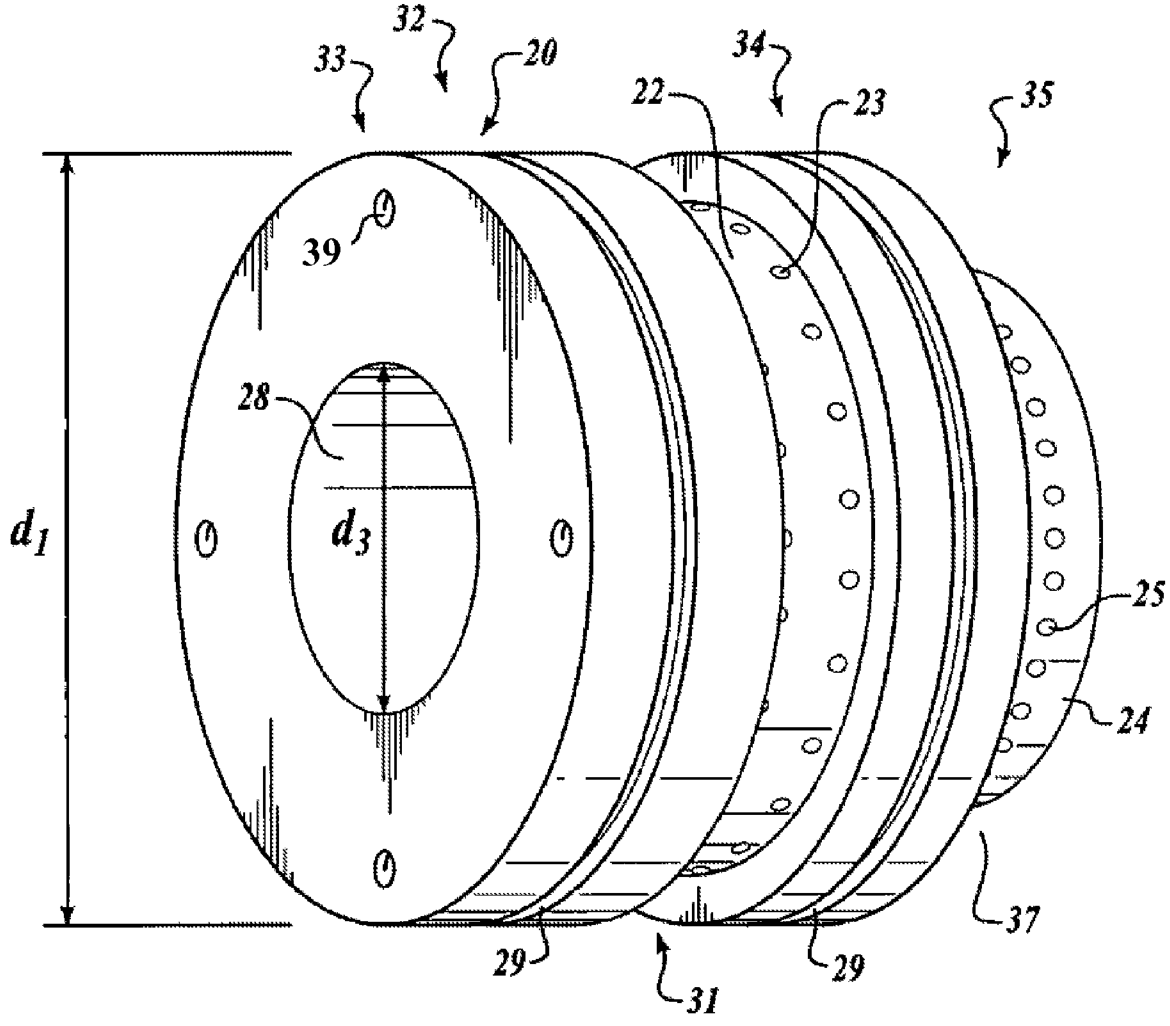
FIG. 2 is an isometric drawing of an exemplary flow conditioner of the present invention.

Turning in more detail to the flow conditioner, FIG. 2 is an isometric view of the exemplary flow conditioner 20 of the FIG. 1. The flow conditioner 20 in this example is fabricated from a cylinder of suitable material, such as plastic or metal with an outer diameter $d_1$ that fits snugly within the inside diameter $d_1$ of the body 13 of the nozzle 11 of FIG. 1. The conditioner 20 in this example is hollow, having a cylindrical inside open core 28 with a diameter $d_3$ that snugly receives the stem 44 of the diffuser 40 of FIG. 1 at the head end 33 of the conditioner 20. Fastener holes 31 provide a means for the collector 20 to be attached at a head end 33 to the base 95 (not shown) of the nozzle 11.

The central core 28 of diameter $d_3$ penetrates the cylindrical flow conditioner 20 from the head end 33 to a tail end 35. The conditioner 20 includes two lateral sealing ring notches 29 providing spaces for soft sealing rings (not shown) to form a tight seal between the conditioner 20 and the body 13 of the nozzle 11, when the conditioner is held within the body 13. Between the two retainer ring notches 29 is a larger first plenum notch 31 that surrounds the entire conditioner 20. The first plenum notch 31 is inset into the body of the conditioner 20 around the entire diameter of the conditioner 20, its inside surface defined by a first baffle 22. The first baffle 22 is a cylindrical baffle, and may be machined as a part of the conditioner 20 body. The first baffle 22 is formed by a plurality of first baffle holes 23 arranged in two rings of radial holes through the cylinder of the first baffle 22 from the first plenum chamber $P_1$ into the second plenum chamber $P_2$. The two rows of radial holes 23 are positioned in separate rings of holes with the holes offset forming two staggered rows of holes extending at equal spacing around the diameter of the first baffle 22. By way of example, but not limitation, in one embodiment, the first baffle holes are 0.070 inches in diameter with 24 holes per row. The baffle holes 23 and configuration are sized large enough to pass any anticipated contaminants in the fluid-flow which might clog the baffle 22. It will be appreciated that any suitable perforation or aperture shape or configuration may be utilized to define the first baffle 22.

Moving from the first plenum notch 31 towards the tail end 35 of the collector 20, after a second full diameter section 34 with the second seal notch 29, a second plenum notch 37 is inset into the conditioner 20 around its entire outside diameter. This second plenum notch 37 (defining the fourth plenum $P_4$, see FIG. 3, below) has an inside surface defined by a cylindrical second baffle 24. The second baffle 24 may also be machined as part of the collector 20. The second baffle 24 has an outside diameter less than $d_1$, the inside diameter of the body 13. The second baffle 24, similar to the first baffle 22, includes two staggered rows of holes of second baffle holes 25 radially penetrating the cylindrical second baffle 24 linking the third plenum chamber $P_3$ (not visible in this view) from the fourth plenum chamber $P_4$.

Figure 3:
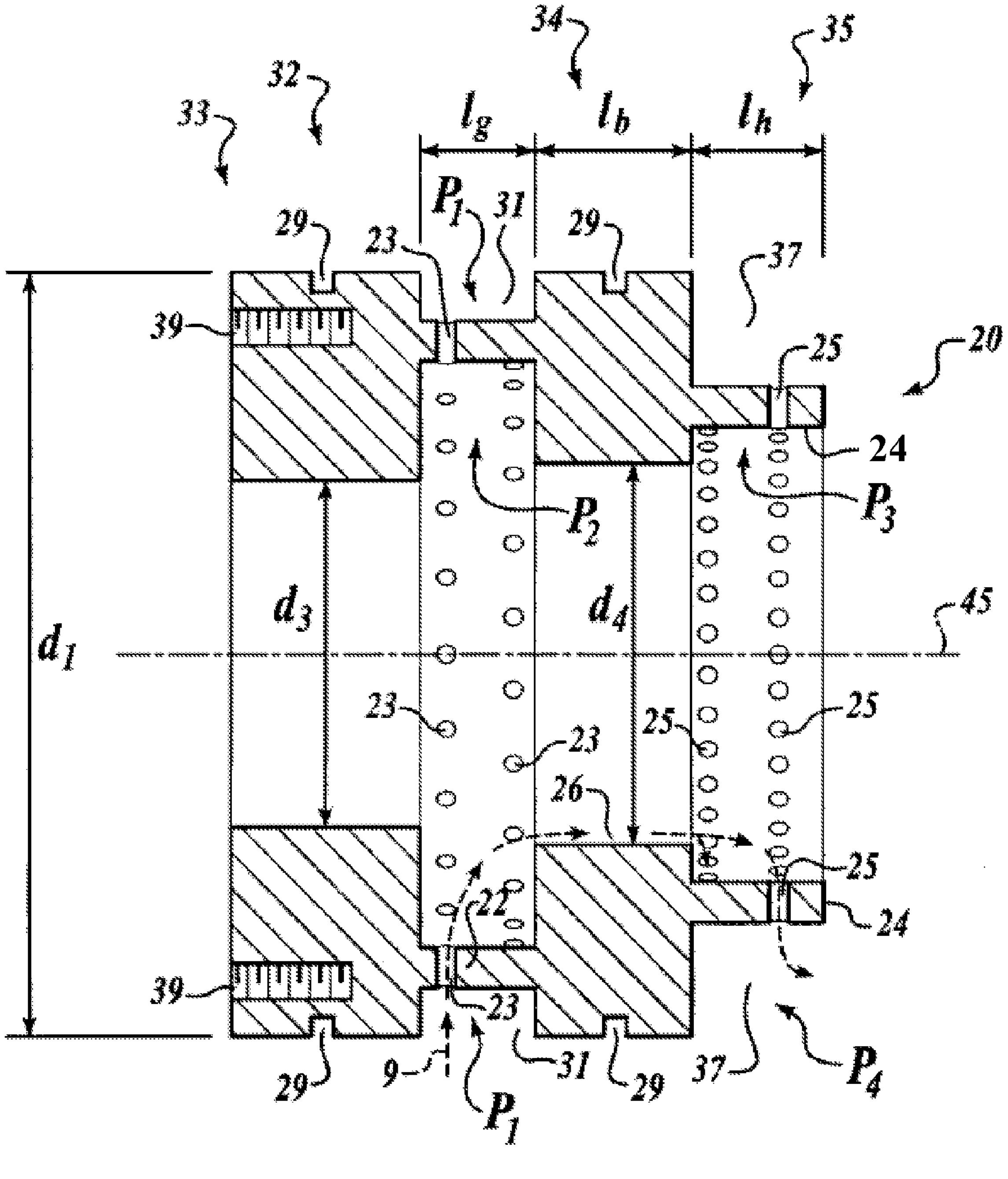
FIG. 3 is a cross-section of an exemplary flow conditioner of the present invention.

The flow conditioner 20 of FIGS. 1 and 2 is shown in cross-section in FIG. 3. The conditioner 20 has the same longitudinal axis 45 as the nozzle 11. This exemplary flow conditioner 20, proceeding from the head end 33 (which when installed is proximal to the base 95 of the nozzle 11 of FIG. 1) to the tail end 35, has four sections 32, 31, 34, and 37 along its cylindrical length. At the head end 33 the first section 32 has an outside diameter $d_1$ to fit tightly within the body 13, and an inside diameter $d_3$ to securely receive the stem 44 of the diffuser 40. No fluid penetrates or flows through the first section 32 of the conditioner 20. The head end 33 of the first section 32 includes threaded receptacles 39 to receive fasteners to hold the conditioner 20 to the base 95.

The second section of the conditioner 20 is defined by the first plenum notch 31. The first plenum notch 31 and hence the first plenum chamber $P_1$ is bounded on the inside by the outside diameter of the first baffle 22, in this example a cylinder penetrated by two staggered rows of first holes 23. The first baffle 22 has an outside diameter less than $d_1$, and a width $l_g$, in this example, of approximately 0.375 of an inch. In one particular embodiment, the two staggered rows of 24 uniformly spaced first holes 23 are approximately 0.07 inches in diameter and penetrate radially inward through the cylindrical first baffle 22. The cylindrical first baffle 22 has an inside diameter larger than $d_3$, the diameter of the stem 44 of the diffuser 40 of FIG. 1 nesting within the conditioner 20 when the nozzle 11 is assembled. The outside of the stem 44 (not shown here) and the inside of the first baffle 22 thus defines the second plenum chamber $P_2$. The fluid path 9 (FIG. 1) entering the first plenum chamber $P_1$ flows through the first baffle 22 into the second plenum chamber $P_2$.

The third section 34 of the conditioner 20 has an outside diameter $d_1$ matching the inside diameter of the body 13 of the nozzle 11 of FIG. 1. The third section 34 has an inside diameter $d_4$ larger than the diameter $d_3$ of the stem 44 of the diffuser 40, thus forming an annular or ring-shaped first axial passageway 26 between the stem 44 (not shown) and the conditioner 20. The inside diameter of this section 34, $d_4$, is larger than $d_3$, and thus the first axial passageway 26 is generally ring-shaped around the outside of the stem 44. The fluid path 9 thus runs through the first axial passageway 26 from the second plenum chamber $P_2$ to the third plenum chamber $P_3$.

The fourth section of the conditioner 20 is defined by the second plenum notch 37 formed by the cylindrical second baffle 24 with an outside diameter less than $d_1$ and an inside diameter greater than $d_3$, thus defining the third plenum chamber $P_3$ within the second baffle 24 (i.e. towards the stem 44), and the fourth plenum chamber $P_4$ outside the second baffle 24 (i.e. towards the body 13). The second baffle 24, by way of example, not limitation, is also cylindrical with a width of approximately 0.345 inches. The second baffle is penetrated by two staggered rings of uniformly spaced second holes 25 extending radially through the cylindrical second baffle 24. By way of example, but not limitation, the second baffle 22 includes two rows of 36 holes with each hole being approximately 0.07 inches in diameter, the diameter of the holes suitably large enough to pass any anticipated contamination in the fluid-flow. It will be appreciated that any suitable perforation or aperture configuration may be utilized to define the second baffle 24.

The conditioner 20 also includes an additional lip area 24 extending the second baffle 24 a slight distance to fit into an inset 48 in the shoulder 53 of the diffuser 40 (not shown) sealing the third plenum chamber $P_3$ between the conditioner 20, the diffuser 40 and the second baffle 25, when the diffuser 40 and the collector 20 are assembled to the base 95 of the nozzle 11 of FIG. 1. The inset 48 may provide space for further soft sealing rings (not shown) to form a tight seal.

Figure 4:
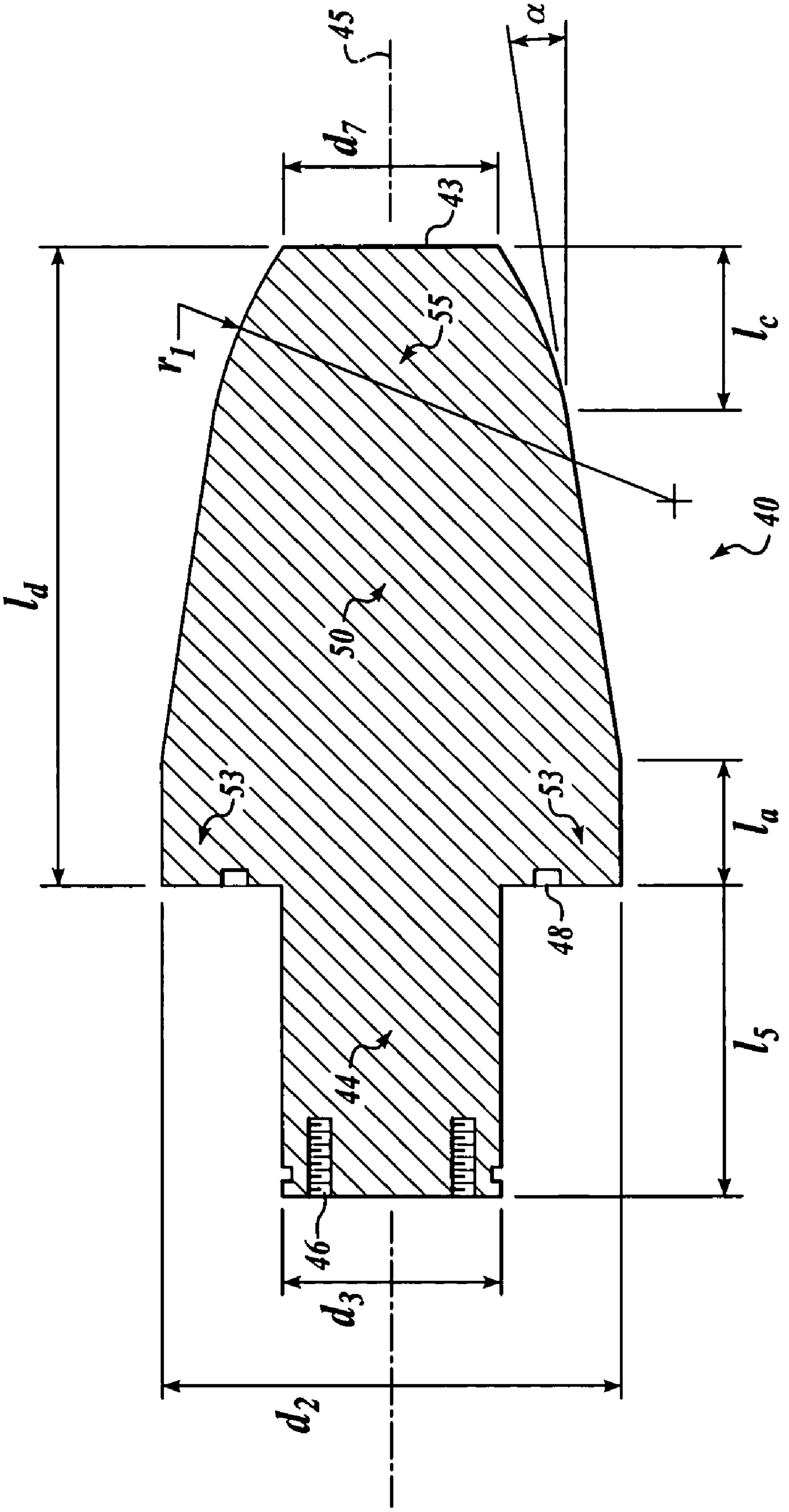
FIG. 4 is a cross-section of an exemplary diffuser of the present invention.

The fluid path 9 thus enters the first plenum notch 31 defining the first plenum chamber $P_1$, penetrates the first baffle 22 through first holes 23 into the second plenum $P_2$, flows along the first axial passageway 26 to the third plenum chamber $P_3$, then radially moves outward through the second holes 25 in the second baffle 24 into the fourth plenum chamber $P_4$ from which point the flow is controlled by the interface between the diffuser 40 and the body 13 as described with respect to FIG. 1 above and FIG. 4 following.

FIG. 4 is a cross-section of an exemplary diffuser 40 in accordance with an embodiment of the present invention. The diffuser 40 has the same longitudinal axis 45 as the nozzle 11. The diffuser 40 includes a stem 44 with a diameter $d_3$ and a tapering head 50 attached to the stem 44. The tapering (in this example rounded conical) head 50 has base diameter of $d_2$ greater than $d_3$. The head 50 is cylindrical with a diameter of $d_2$ for a distance la and then tapers linearly at an angle $\alpha$, to a tip area 55. By way of example, but without limitation, the taper angle $\alpha$ suitably may be approximately 8°. At the tip area 55, with a length $l_e$, the diffuser head 50 narrows further inward along a curve of a radius $r_1$. In one embodiment, by way of example and not limitation, the radius $r_1$ may be approximately 2.5 inches, and the tip area length $l_e$ is approximately the last 1.0" of the head 50 of the diffuser 40. In the embodiment shown in FIG. 4, the diffuser head 50, by way of example and not limitation, may have an overall length $l_d$ of approximately 3.3", with a cylindrical base portion of the head 50 proximate to the shoulders 53 having a diameter $d_2$ of approximately 2.375 inches, and a cylindrical length $l_a$ of 0.5". Of course, in alternate embodiments, these particular dimensions of the diffuser 40 may be adjusted as desired.

The stem 44 of the diffuser 40 has a diameter of approximately 1.125" and is cylindrical. The stem has threaded recesses 46 arranged to accept fasteners (not shown) to fasten the stem end of the diffuser 40 to the base 95 of FIG. 1 (not shown). The tip 55 of the diffuser head 50 has a diameter $d_7$. Diameter $d_7$ by way of example, but not limitation, is approximately 1.125". The stem 44 has a length $l_5$, by way of example, but not limitation, of approximately 1.625". The tip surface 43 of the diffuser 40 is in this example flattened and thus suitably adapted to receive a transducer (not shown).

Figure 5:
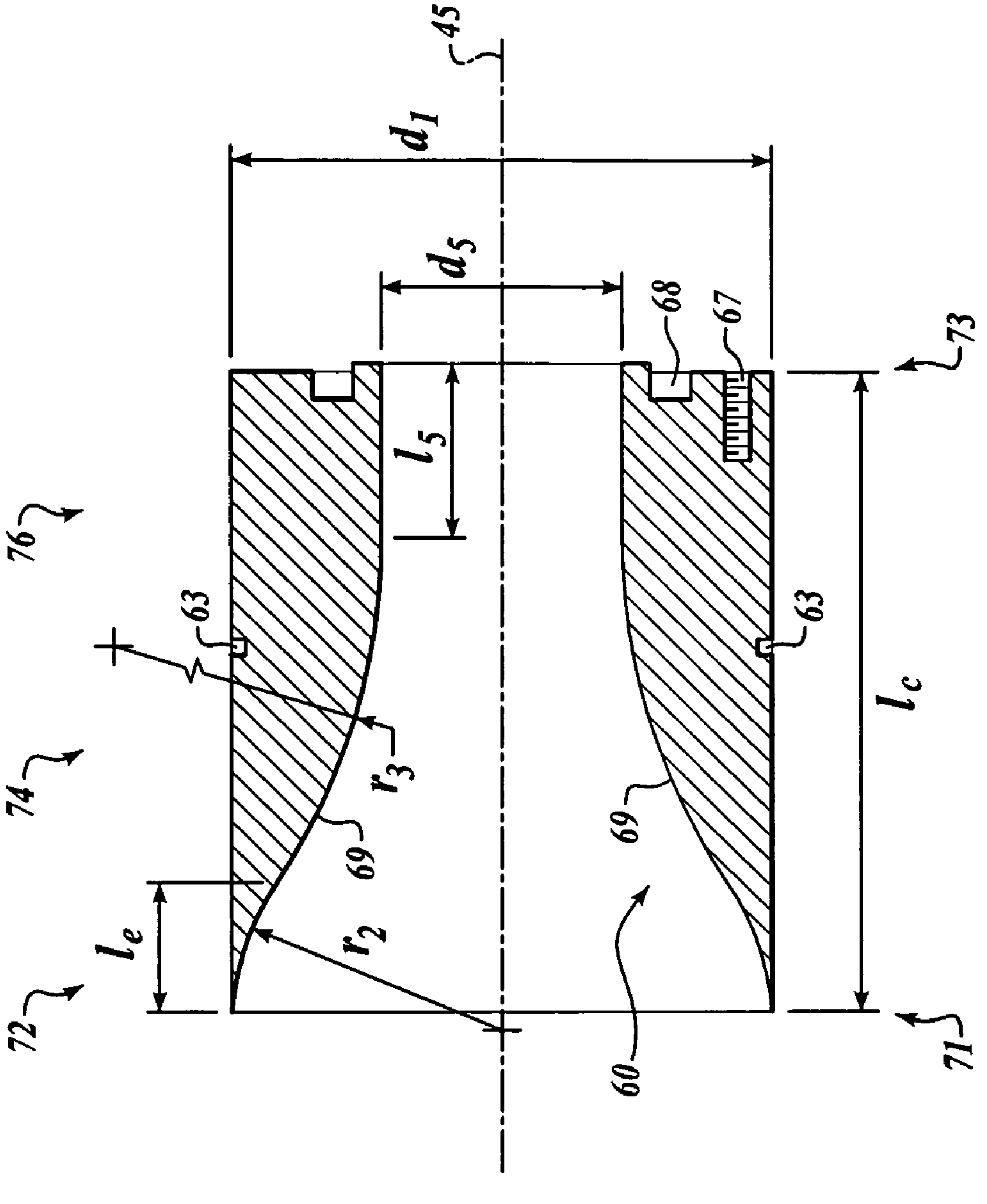
FIG. 5 is a cross section of an exemplary flow collector of the present invention.

FIG. 5 is a cross-section of the exemplary collector 60 of the nozzle 11 of FIG. 1. The collector 60 has the same longitudinal axis 45 as the nozzle 11. By way of example, but not limitation, the collector has an outside diameter $d_1$ adapted to fit snugly within the inside diameter of the body 13. The collector includes a seal notch 63 where a soft seal ring can be inserted to seal the collector 60 within the body 13 of the nozzle 11 (not shown).

The collector 60 has a length $l_c$ between its entrance end 71 and its exit end 73. At the entrance end 71 the inside diameter of collector 60 approximately equals that of the inside diameter of the body 13, in other words, the entrance end 71 of the collector tapers to an approximately zero thickness so it may smoothly pick up flow moving axially past the end of the diffuser 40. The inside diameter of the collector 60 decreases smoothly towards the exit end 73 to a final inner diameter of the collector $d_5$.

Proceeding from the entrance end 71 to the exit end 73, this exemplary collector 60 includes three sections: a first section 72, second section 74, and third section 76. The first section 72 has a length $l_e$ where the inside wall 69 of the collector 60 decreases in diameter from d, smoothly along a curve of radius $r_2$. The inside wall 69 of the collector 60 thus curves gently away (i.e. inward) from the cylindrical wall of the body 13 (not shown) and towards axis 45. At the second section 74, the inside wall 69 of the collector 60 further decreases in diameter smoothly along an outwardly bending curve of radius $r_3$ transitioning the inner wall 69 of the collector 60 back to parallel with the axis 45 by the start of the third section 76 of the collector 60. The last and third section 76 of the collector 60 has a cylindrical inside diameter $d_5$ and a length of $l_5$. Diameter $d_5$ and length $l_5$ are by way of example 1.12" and 0.77" respectively.

At the exit end 73 of the collector 60, a circular notch 68 is inscribed into the end 73 for holding the orifice cap 83 (not shown) of the nozzle 11 of FIG. 1 centered over the exit end 73 of the collector 60. The collector 60 also includes fastener holes 67 at the exit end 73 permitting the collector 60 to be fastened to the orifice retainer cap 85. The orifice retainer cap 85 then is linked to the body 13 through matching internal and external threads, holding the collector 60 within the body 13 (not shown). It will be appreciated that any suitable curvature for the collector 60 may be utilized to smoothly transition the fluid flow into and against the orifice cap 83.

Embodiments of apparatus and methods in accordance with the present invention may provide significant advantages over the prior art. For example, embodiments of the present invention advantageously provide the desired degree of flow conditioning so that use of a filter is eliminated. Because the nozzle assembly is filterless, there may be less down time associated with filter cleaning or replacement in comparison with prior art nozzle assemblies. Also, certain additives may be used in the fluid medium to improve the acoustic coupling, additives that may clog a media filter.

Figure 6:
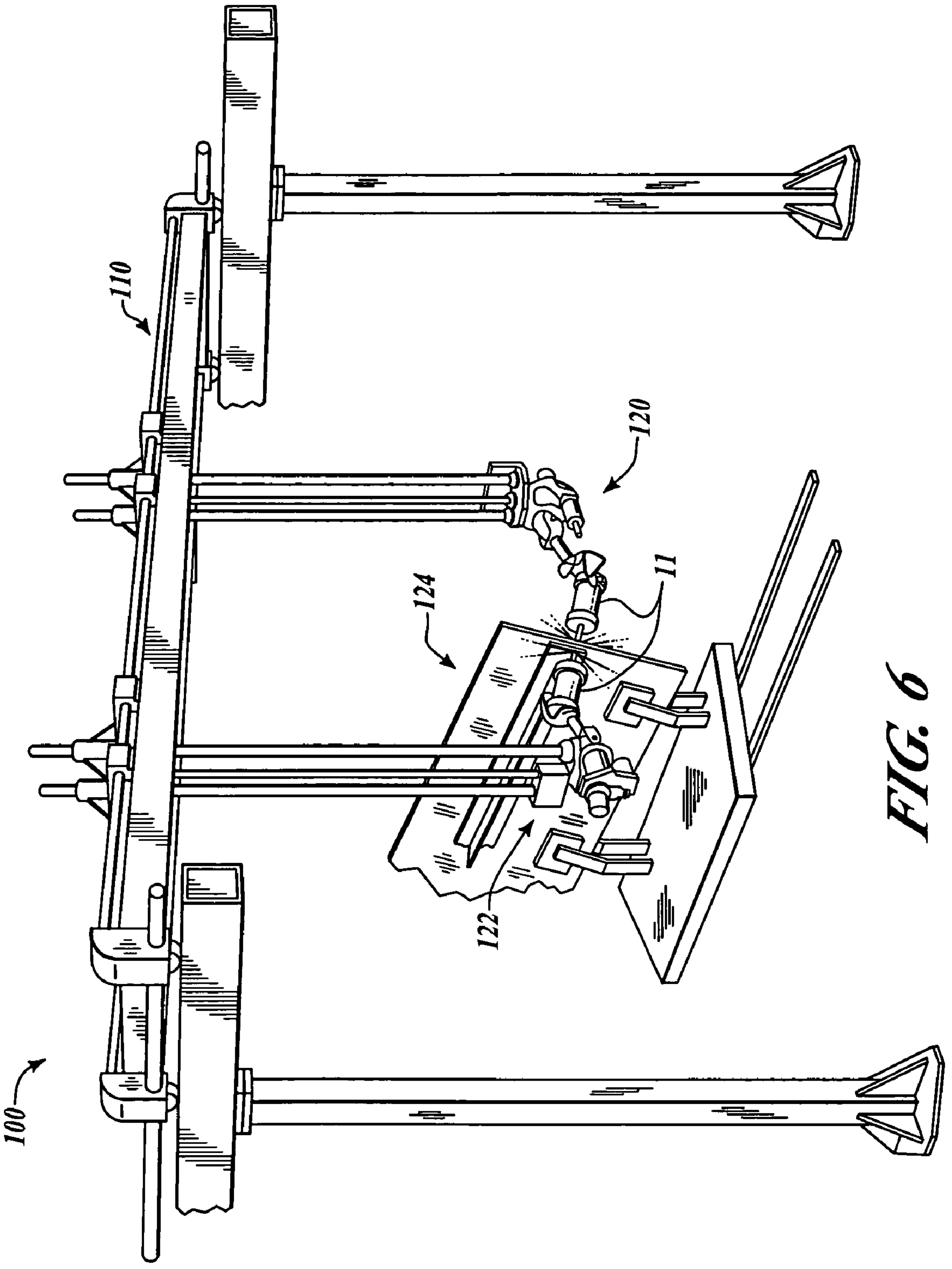
FIG. 6 is a perspective view showing an ultrasonic scanning apparatus including a nozzle in accordance with another embodiment of the invention.
Figure 7:
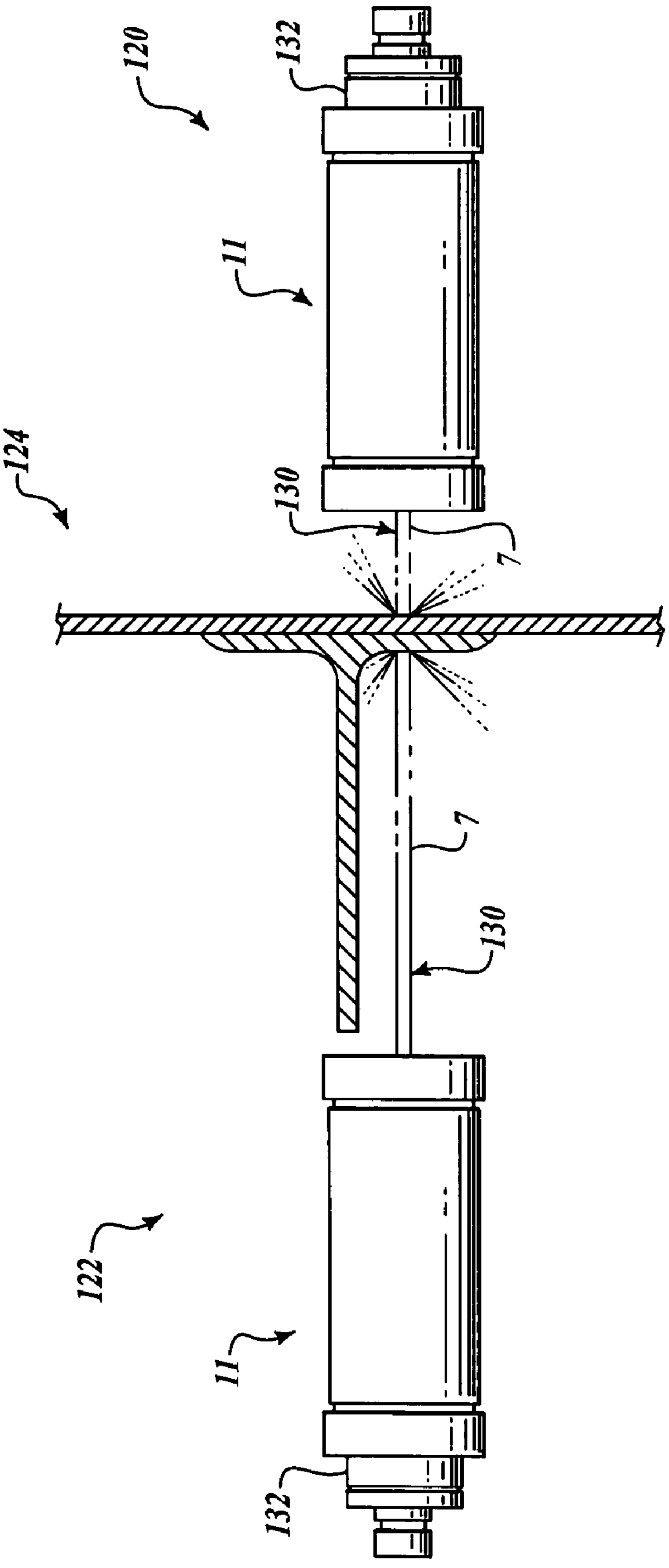
FIG. 7 is an enlarged partial view of the ultrasonic scanning apparatus of FIG. 6.

FIG. 6 is a perspective view showing an ultrasonic scanning apparatus 100 in accordance with another embodiment of the invention. FIG. 7 is an enlarged partial view of the ultrasonic scanning apparatus 100 of FIG. 6. In this embodiment, the ultrasonic scanning apparatus 100 includes a positioning system 110 for controllably positioning first and second transducer assemblies 120, 122 proximate a workpiece 124. The first and second transducer assemblies 120, 122 are coupled to fluid sources that provide a flow of fluid (e.g. water) to the nozzle assemblies 11 in accordance with the present invention. As described above, each nozzle assembly 11 provides a flow stream 7 that may serve as a transmission medium for ultrasonic signals 130 emitted and/or received by a transducer 132 of each of the first and second transducer assemblies 120, 122.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A nozzle assembly for providing a flow stream of a fluid medium along a longitudinal axis, comprising:

an outerbody having at least one intake adapted to receive the fluid medium;

an innerbody disposed within the outerbody, the innerbody including:

a first portion adapted to receive the fluid medium radially with respect to the longitudinal axis through a plurality of first baffle apertures into a first chamber;

a second portion adapted to provide a first passage for the fluid medium from the first chamber to a second chamber, the second chamber being spaced apart from the first chamber along the longitudinal axis;

a third portion adapted to receive the fluid medium from the second chamber radially with respect to the longitudinal axis through a plurality of second baffle apertures into a third chamber; and a conical annular diffuser portion adapted to provide a second passage for the fluid medium from the third chamber to an exit aperture, the exit aperture being spaced apart from the third chamber along the longitudinal axis, the second passage having an increasing width along the longitudinal axis.

2. The nozzle assembly of claim 1, wherein the second passage includes a diverging area portion and a converging narrowing area portion.

3. The nozzle assembly of claim 2, wherein the diverging area portion comprises an annular portion formed between the outerbody and the innerbody.

4. The nozzle assembly of claim 1, wherein the innerbody further includes a collector portion downstream of the diffuser portion.

5. The nozzle assembly of claim 1, wherein the innerbody includes a flow conditioner portion at least partially disposed about the diffuser portion, the first chamber being formed between the flow conditioner portion and the diffuser portion, the plurality of first baffle apertures being formed in the flow conditioner portion.

6. The nozzle assembly of claim 5, wherein the first passage is formed between the flow conditioner portion and the diffuser portion.

7. The nozzle assembly of claim 6, wherein the second chamber is formed between the flow conditioner portion and the diffuser portion, the plurality of second baffle apertures being formed in the flow conditioner portion.

8. The nozzle assembly of claim 7, wherein the third chamber is formed between the flow conditioner portion and the outerbody.

9. The nozzle assembly of claim 8, wherein the second passage is at least partially disposed between the diffuser portion and the outerbody.

10. A nozzle for providing a flow, comprising:

a hollow body with a first length defining an axial direction including a component parallel to the first length and a radial direction including a component orthogonal to the first length, with an entrance and an exit orifice, and defining a flow direction from the entrance towards the exit orifice;

a flow conditioner within the body defining at least a first plenum chamber in fluid communication with the entrance, a second plenum chamber and a third plenum chamber, the first plenum chamber and the second plenum chamber separated by a first baffle arranged to permit fluid communication between the first plenum chamber and the second plenum chamber, and the second plenum chamber and the third plenum chamber separated by a first passageway, the first passageway arranged to permit fluid communication between the second plenum chamber and the third plenum chamber, the first passageway having a first width and a second length;

a diffuser within the body defining a fourth plenum chamber, the fourth plenum chamber arranged to fluidly communicate with the third plenum chamber, and the fourth plenum chamber defining a widening area, the widening area having an increasing width in the flow direction; and a collector within the body defining a fifth plenum chamber, the fifth plenum chamber arranged to fluidly communicate with the fourth plenum chamber and with the exit orifice, and the fifth plenum chamber defining a narrowing area, the narrowing area having a decreasing width in the flow direction.

11. The nozzle of claim 10, wherein the second length is at least three times the first width.

12. The nozzle of claim 10, wherein the widening area includes a conical annular diffusing area.

13. The nozzle of claim 10, wherein the first plenum chamber and the second plenum chamber are annular, the first plenum chamber circumscribes the second plenum chamber, and first baffle includes a plurality of first holes permitting fluid communication between the first plenum chamber and the second plenum chamber in the radial direction.

14. The nozzle of claim 10, wherein the third plenum chamber is annular, the first passageway is annular, and the first passageway permits fluid communication between the second plenum chamber and the third plenum chamber in the axial direction.

15. The nozzle of claim 10, wherein the flow conditioner further defines a sixth plenum chamber in fluid communication with the third plenum chamber and the fourth plenum chamber, the sixth plenum chamber separated from the third plenum chamber by a second baffle arranged to permit fluid communication between the third plenum chamber and the sixth plenum chamber; and the sixth plenum chamber and the fourth plenum chamber separated by a second passageway, the second passageway arranged to permit fluid communication between the fifth plenum chamber and the fourth plenum chamber, the second passageway having a second width and a third length, the third length being at least three times the second width.

16. A flow conditioner for a flow nozzle, comprising a body having:

an inner bore;

a first baffle section formed by a first plenum notch in an outer portion of the body, the first baffle section having a plurality of first orifices extending between the first notch and the inner bore; and a second baffle section formed by a second plenum notch in the outer portion of the body, the second plenum notch downstream of the first notch, the second baffle section having a plurality of second orifices extending between the second notch and the inner bore;

wherein the first plenum notch and the first orifices provide a first fluid passageway that extends radially inward from an inlet to the inner bore, the inner bore provides a second fluid passageway that extends along a longitudinal axis in a first direction, the second orifices provide third fluid passageway that extends radially outward from the inner bore to the second plenum notch, and the second plenum notch provides fourth fluid passageway that extends along the longitudinal axis in the first direction toward an outlet.

17. The flow conditioner of claim 16, wherein the first baffle section is also formed by a notch in an inner portion of the body.

18. The flow conditioner of claim 16, wherein the second baffle section is also formed by a notch in an inner portion of the body.

19. Apparatus comprising the flow conditioner of claim 16 and a diffuser at the outlet of the flow conditioner, the diffuser having a stem portion that is inserted in the inner bore and a conical annular diffuser portion at the outlet of the flow conditioner.

20. The flow conditioner of claim 16, wherein the first baffle section has a greater diameter than the second baffle section.

* * * * *

UNITED STATES PATENT AND TRADEMARK OFFICE

CERTIFICATE OF CORRECTION

PATENT NO. : 7,607,594 B2
APPLICATION NO. : 11/027572
DATED : October 27, 2009
INVENTOR(S) : Kondala R. Saripalli It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1076 days.

Signed and Sealed this

Twelfth Day of October, 2010

David J. Kappos

David J. Kappos
*Director of the United States Patent and Trademark Office*